United States Patent
Uehara et al.

(10) Patent No.: US 8,097,672 B2
(45) Date of Patent: Jan. 17, 2012

(54) CROSSLINKED MATERIAL OF PROPYLENE RESIN COMPOSITION, A PROCESS FOR PRODUCING THE CROSSLINKED MATERIAL AND CROSSLINKED MOLDED ARTICLE FORMED FROM THE CROSSLINKED MATERIAL

(75) Inventors: Hiroshi Uehara, Chiba (JP); Kiminori Noda, Mobara (JP); Masayoshi Yamaguchi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 90 days.

(21) Appl. No.: 12/451,242

(22) PCT Filed: Apr. 23, 2008

(86) PCT No.: PCT/JP2008/057869
§ 371 (c)(1),
(2), (4) Date: Nov. 2, 2009

(87) PCT Pub. No.: WO2008/139874
PCT Pub. Date: Nov. 20, 2008

(65) Prior Publication Data
US 2010/0130662 A1    May 27, 2010

(30) Foreign Application Priority Data
May 8, 2007   (JP) ................................. 2007-123014

(51) Int. Cl.
*C08K 3/22* (2006.01)
*C08K 3/26* (2006.01)
(52) U.S. Cl. ........ 524/430; 524/423; 524/427; 524/436; 524/437; 174/110 SR
(58) Field of Classification Search ................. 524/427, 524/430, 436, 437, 423
See application file for complete search history.

(56) References Cited

U.S. PATENT DOCUMENTS

| | | | |
|---|---|---|---|
| 4,916,165 A * | 4/1990 | Hashimoto et al. ............. 521/96 | |
| 6,190,772 B1 | 2/2001 | Yamano et al. | |
| 7,201,970 B2 | 4/2007 | Kanamori et al. | |
| 2006/0276607 A1 | 12/2006 | Ikenaga et al. | |
| 2008/0227919 A9 * | 9/2008 | Li et al. .......................... | 525/240 |
| 2008/0306219 A1 * | 12/2008 | Ikenaga et al. ................ | 525/240 |

FOREIGN PATENT DOCUMENTS

| | | |
|---|---|---|
| EP | 0 470 701 A2 | 2/1992 |
| EP | 0 792 905 A2 | 9/1997 |
| JP | 57-172926 | 10/1982 |
| JP | 10-501297 | 2/1998 |
| JP | 11-80378 | 3/1999 |
| JP | 2000-26696 | 1/2000 |
| JP | 2003-313377 | 11/2003 |
| WO | WO 95/34597 | 12/1995 |
| WO | WO 2004/087775 | 10/2004 |
| WO | WO-2007/045536 A1 | 4/2007 |

OTHER PUBLICATIONS

Communication (Supplementary European Search Report) in EP Appln No. 08 75 1998 dated Dec. 1, 2010.

* cited by examiner

*Primary Examiner* — Peter Szekely

(74) *Attorney, Agent, or Firm* — Foley & Lardner LLP

(57) ABSTRACT

The crosslinked material of the present invention is obtainable by crosslinking a propylene resin composition through irradiation with an ionizing radiation wherein the propylene resin composition comprises 100 parts by mass of a propylene resin comprising 15 to 99% by mass of a propylene polymer (A) having a melting point, as measured by a differential scanning calorimeter (DSC), of 120 to 170° C., and 1 to 85% by mass of a propylene polymer (B) having a melting point, as measured by a differential scanning calorimeter (DSC), of below 120° C. or not observed (provided that the total of the components (A) and (B) is 100% by mass), and 0.1 to 5 parts by mass of a crosslinking assistant (C). The production process of the crosslinked material of the present invention comprises a step of molding the propylene resin composition into a molded form, and a step of crosslinking the molded form through irradiation with an ionizing radiation. The crosslinked molded article of the present invention is formed from the crosslinked material.

7 Claims, No Drawings

CROSSLINKED MATERIAL OF PROPYLENE RESIN COMPOSITION, A PROCESS FOR PRODUCING THE CROSSLINKED MATERIAL AND CROSSLINKED MOLDED ARTICLE FORMED FROM THE CROSSLINKED MATERIAL

TECHNICAL FIELD OF THE INVENTION

The present invention relates to a crosslinked material obtainable by irradiating a propylene resin composition containing a crosslinking assistant with an ionizing radiation, a process for producing the crosslinked material, and a crosslinked molded article formed from the crosslinked material.

BACKGROUND ART

Propylene polymers are materials having more excellent heat resistance, mechanical strength and scratch resistance as compared with ethylene polymers (ethylene elastomers), and molded articles of the propylene polymers are open to utilization for various uses. For example, electric wires or wire harnesses in need of scratch resistance are known as a molded article which comprises a propylene polymer and an inorganic filler, and particularly a flame retardant. Moreover, molded articles obtainable from a general polypropylene and an inorganic filler have excellent mechanical strength.

The above molded articles have the above properties, but are inferior in flexibility. For the problem, Patent document 1 discloses a flame retardant polypropylene resin composition which comprises a polypropylene resin and an inorganic flame retardant, but molded articles obtainable from the resin composition have a problem in that the heat resistance is not sufficient.

Furthermore, Patent document 2 discloses a flame retardant resin composition which comprises, as a polymer component, a propylene-ethylene block copolymer and a polyolefin-rubber thermoplastic elastomer, and a metal hydroxide. However, molded articles obtainable from the flame retardant resin composition have a problem in that the wear resistance and the heat resistance are not sufficient.

Moreover, the propylene polymers have a problem in that crosslinking thereof is difficult. On this account, crosslinked molded articles obtainable from an ethylene polymer susceptible to be crosslinked by a peroxide, silane or electron rays, or crosslinked molded articles obtainable from an ethylene polymer and an inorganic filler are used for the uses in need of high heat resistance. The above described crosslinked molded articles, however, have a problem in that the scratch resistance is inferior. Under the circumstances, crosslinked molded articles having both of excellent heat resistance and scratch resistance have not been obtained yet.
Patent Document 1: JP-A-2003-313377
Patent Document 2: JP-A-2000-026696

DISCLOSURE OF THE INVENTION

Subject to be Solved by the Invention

It is an object of the invention to provide a crosslinked material having excellent heat resistance and scratch resistance, which material is obtainable by irradiating a resin composition containing a propylene polymer with an ionizing radiation. It is another object of the invention to provide a crosslinked molded article formed from the crosslinked material, and an insulation of an electric wire or a sheath of an electric wire.

Means for Solving the Subject

The present inventors have been earnestly studied in order to solve the above subjects, and found that a propylene resin composition which comprises a specific propylene polymer and a crosslinking assistant is crosslinked through irradiation with an ionizing radiation and thereby a crosslinked material of the propylene resin composition having more excellent heat resistance as compared with that of conventional polypropylenes can be prepared. Thus, the present invention has been accomplished.

That is to say, the present invention relates to the following characteristics [1] to [8].

[1] A crosslinked material obtainable by crosslinking a propylene resin composition through irradiation with an ionizing radiation wherein the propylene resin composition comprises:
100 parts by mass of a propylene resin comprising 15 to 99% by mass of a propylene polymer (A) having a melting point, as measured by a differential scanning calorimeter (DSC), of 120 to 170° C., and 1 to 85% by mass of a propylene polymer (B) having a melting point, as measured by a differential scanning calorimeter (DSC), of below 120° C. or not observed provided that the total of the components (A) and (B) is 100% by mass, and
0.1 to 5 parts by mass of a crosslinking assistant (C).

[2] The crosslinked material according to [1] wherein the propylene resin composition further comprises 30 to 300 parts by mass of an inorganic filler (D) based on 100 parts by mass of the propylene resin.

[3] The crosslinked material according to [2] wherein the inorganic filler (D) is at least one selected from a metal hydroxide, a metal carbonate and a metal oxide.

[4] The crosslinked material according to any one of [1] to [3] wherein the crosslinking assistant (C) is triallyl cyanurate or triallyl isocyanurate.

[5] The crosslinked material according to any one of [1] to [3] wherein the propylene polymer (A) comprises 50 to 100 mol % of a constitutional unit derived from propylene and 0 to 50 mol % of a constitutional unit derived from an α-olefin having 2 to 20 carbon atoms other than propylene provided that the total of the constitutional unit derived from propylene and the constitutional unit derived from an α-olefin having 2 to 20 carbon atoms other than propylene is 100 mol %, and the propylene polymer (B) comprises 40 to 100 mol % of a constitutional unit derived from propylene and 0 to 60 mol % of a constitutional unit derived from an α-olefin having 2 to 20 carbon atoms other than propylene provided that the total of the constitutional unit derived from propylene and the constitutional unit derived from an α-olefin having 2 to 20 carbon atoms other than propylene is 100 mol %.

[6] A process for producing a crosslinked material which process comprises:
a step of molding the propylene resin composition as described in any one of [1] to [3] into a molded form and
a step of crosslinking the molded form through irradiation with an ionizing radiation.

[7] A crosslinked molded article comprising the crosslinked material according to any one of [1] to [3].

[8] The crosslinked molded article according to [7] is an insulation of an electric wire or a sheath of an electric wire.

Effect of the Invention

The crosslinked material of the propylene resin composition and the crosslinked molded article according to the present invention have excellent scratch resistance and heat resistance. Furthermore, when the propylene resin composition contains an inorganic filler, it is possible to prepare a crosslinked material and a crosslinked molded article both having excellent flame retardant properties.

BEST MODE FOR CARRYING OUT THE INVENTION

Hereinafter, the crosslinked material, the production method of the crosslinked material, and the crosslinked molded article formed from the crosslinked material according to the present invention will be described in detail.

Crosslinked Material

The crosslinked material of the present invention is obtainable by crosslinking a propylene resin composition, which comprises a propylene resin formed from a propylene polymer (A) and a propylene polymer (B), and a crosslinking assistant (C) in a specific proportion, through irradiation with an ionizing radiation.

<Propylene Polymer (A)>

Examples of the propylene polymer (A) used in the invention are a propylene homopolymer and a copolymer of propylene and at least one of α-olefins having 2 to 20 carbon atoms other than propylene. In the present invention, the α-olefins having 2 to 20 carbon atoms other than propylene indicate α-olefins comprising ethylene having 2 to 20 carbon atoms other than propylene.

Specific examples of the a-olefins having 2 to 20 carbon atoms other than propylene are ethylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Of these, ethylene or an a-olefin having 4 to 10 carbon atoms is preferred. These α-olefins may form a random copolymer together with propylene, and further may form a block copolymer together with propylene.

The propylene polymer (A) has a content of the constitutional unit derived from propylene of usually 50 to 100 mol %, preferably 50 to 95 mol %, more preferably 65 to 90 mol %, especially 70 to 90 mol % based on all the constitutional units. The propylene polymer (A) has a content of the constitutional unit derived from the α-olefin of usually 0 to 50 mol %, preferably 5 to 50 mol %, more preferably 10 to 35 mol %, especially 10 to 30 mol % based on all the constitutional units. In the invention, the total of the constitutional unit derived from propylene and the constitutional unit derived from the α-olefin is preferably 100 mol %.

The propylene polymer (A) used in the present invention has a melt flow rate MFR, as determined by ASTM D1238 at 230° C. under a load of 2.16 Kg, of usually 0.01 to 1000 g/10 min, preferably 0.05 to 100 g/10 min, more preferably 0.1 to 50 g/10 min.

The propylene polymer (A) has a melting point (Tm), as measured in a differential scanning calorimeter (DSC), of usually not less than 120° C., preferably 120 to 170° C., more preferably 125 to 165° C.

The propylene polymer (A) used in the present invention may have any of an isotactic structure and a syndiotactic structure, and preferably has an isotactic structure in terms of heat resistance and the like.

Two or more kinds of the propylene polymers (A) can be used simultaneously if necessary. For example, two or more kinds of the propylene polymers (A) having different melting points and rigidities can be used simultaneously.

The propylene polymer (A) may be selected from a homopolypropylene having excellent heat resistance (conventionally known homopolypropylene containing not more than 3 mol % of copolymerization components other than propylene), a block polypropylene having excellent balance between heat resistance and impact resistance (conventionally known block polypropylene containing usually 3 to 30% by mass of rubber components eluted by n-decane) and a random polypropylene having excellent balance between flexibility and transparency (conventionally known random polypropylene having a melting peak, as measured in a differential scanning calorimeter (DSC), of not less than 120° C., preferably 125 to 150° C.) in order to obtain the aimed physical properties. Moreover, these polypropylenes may be used simultaneously.

The propylene polymer (A) used in the present invention can be prepared by homo-polymerizing propylene or copolymerizing propylene and the above α-olefin in the presence of a Ziegler catalyst which comprises a solid catalyst component containing, as essential components, magnesium, titanium, halogen and an electron donor, and an organic metal compound and an electron donor, or a metallocene catalyst containing a metallocene compound as one catalyst component.

<Propylene Polymer (B)>

Examples of the propylene polymer (B) used in the invention area propylene homopolymer and a copolymer of propylene and at least one of α-olefins having 2 to 20 carbon atoms other than propylene. In the present invention, examples of the α-olefins having 2 to 20 carbon atoms other than propylene are the same as those in the propylene polymer (A). Preferable examples thereof are also the same as those in the propylene polymer (A). These α-olefins may form a random copolymer together with propylene, and further may form a block copolymer together with propylene.

The propylene polymer (B) has a content of the constitutional unit derived from propylene of usually 40 to 100 mol %, preferably 40 to 99 mol %, more preferably 40 to 92 mol %, especially 50 to 90 mol % based on all the constitutional units. The propylene polymer (B) has a content of the constitutional unit derived from an α-olefin having 2 to 20 carbon atoms other than propylene used as a comonomer of usually 0 to 60 mol %, preferably 1 to 60 mol %, more preferably 8 to 60 mol %, especially 10 to 50 mol % based on all the constitutional units. In the invention, the total of the constitutional unit derived from propylene and the constitutional unit derived from an α-olefin having 2 to 20 carbon atoms other than propylene is preferably 100 mol %.

The propylene polymer (B) used in the present invention has a melt flow rate MFR, as determined by ASTM D1238 at 230° C. under a load of 2.16 Kg, of usually 0.1 to 50 g/10 min.

The propylene polymer (B) used in the present invention has a melting point (Tm), as measured in a differential scanning calorimeter (DSC), of usually below 120° C. or not observed, preferably not more than 100° C. or not observed. The case that the melting point is not observed indicates the fact a crystal melting peak having crystal melting enthalpy of not less than 1 J/g is not observed at a temperature of from −150 to 200° C. The measuring conditions are described in Examples.

The propylene polymer (B) used in the present invention has an intrinsic viscosity [η] of usually 0.01 to 10 dl/g, preferably 0.05 to 10 dl/g. The intrinsic viscosity [q] is determined by dissolving a polymer specimen in decalin at 135° C. and measuring a viscosity thereof using an Ubbellohde viscometer.

The propylene polymer (B) has a triad tacticity (mm fraction), as measured by $^{13}$C-NMR, of preferably not less than 85%, more preferably 85 to 97.5%, more preferably 87 to 97%, especially 90 to 97%. The propylene polymer (B) having a triad tacticity (mm fraction) in the above range is suitable for the present invention because of having excellent balance between flexibility and mechanical strength. The mm fraction can be measured using a method described in WO-A-2004-087775 from line 7 on page 21 to line 6 on page 26.

The production method of the propylene polymer (B) is not particularly limited. The propylene polymer (B) can be prepared by homo-polymerizing propylene or copolymerizing propylene and the above α-olefin in the presence of a known catalyst capable of stereoregular polymerizing an olefin in an isotactic structure or syndiotactic structure, for example a catalyst which comprises a solid titanium component and an organic metal compound as main components, or a metallocene catalyst obtainable by using a metallocene compound as a catalyst component. Moreover, the propylene polymer (B) can be prepared by homo-polymerizing propylene or copolymerizing propylene and the above α-olefin in the presence of a known catalyst capable of polymerizing an olefin in an atactic structure. The propylene polymer (B) can be preferably prepared by copolymerizing propylene and the above α-olefin having 2 to 20 carbon atoms other than propylene in the presence of the metallocene catalyst.

An example of the propylene polymer (B) having the above properties may include a random copolymer (B-1) of propylene and an α-olefin having 4 to 20 carbon atoms.

The random copolymer (B-1) of propylene and an α-olefin having 4 to 20 carbon atoms preferably used in the present invention will be described below.

<<Random Copolymer (B-1) of Propylene and an α-Olefin Having 4 to 20 Carbon Atoms>>

The random copolymer (B-1) of propylene and an α-olefin having 4 to 20 carbon atoms preferably used in the invention is a random copolymer containing a constitutional unit derived from propylene and a constitutional unit derived from an α-olefin having 4 to 20 carbon atoms and satisfies the following properties (a) and (b).

(a) The molecular weight distribution (Mw/Mn), as measured by Gel permeation chromatography (GPC), is 1 to 3.

(b) The melting point (Tm) (° C.), and the content M (mol %) of the constitutional unit derived from an α-olefin having 4 to 20 carbon atoms, as determined by $^{13}$C-NMR spectrum, satisfy the following formula (I).

$$146\exp(-0.022M) \geq Tm \geq 125\exp(-0.032M) \quad \text{(I)}$$

The melting point (Tm) of the random copolymer (B-1) of propylene and an α-olefin having 4 to 20 carbon atoms is measured by DSC in the following manner. That is to say, a specimen is packed in an aluminum pan and the temperature thereof is elevated to 200° C. at a rate of 100° C./min and kept at 200° C. for 5 min. Thereafter, the temperature is lowered to −150° C. at a rate of 10° C./min. Subsequently, the temperature is elevated to 200° C. at a rate of 10° C./min and the temperature of an endothermic peak, observed in increasing of the temperature, is the melting point (Tm). The melting point (Tm) is usually below 120° C., preferably lower than or equal to 100° C., more preferably 40 to 95° C., furthermore preferably 50 to 90° C. When the melting point (Tm) falls in the above range, it is possible to prepare a crosslinked molded article having excellent balance between flexibility and mechanical strength. Moreover, the resulting crosslinked molded article has a merit such that the processing thereof is easy because the surface tackiness of the crosslinked molded article is depressed.

In the random copolymer (B-1) of propylene and an α-olefin having 4 to 20 carbon atoms, (c) the crystallinity as measured by X-ray diffraction is preferably less than or equal to 40%, more preferably less than or equal to 35%.

In the random copolymer (B-1) of propylene and an α-olefin having 4 to 20 carbon atoms, the content of the constitutional unit derived from propylene is preferably 50 to 95 mol %, more preferably 65 to 80 mol %, and the content of the constitutional unit derived from an α-olefin having 4 to 20 carbon atoms is preferably 5 to 50 mol %, more preferably 20 to 35 mol %. Particularly, 1-butene is preferably used as the α-olefin having 4 to 20 carbon atoms. Hereupon, the total of the constitutional unit derived from propylene and the constitutional unit derived from the α-olefin is preferably 100 mol %.

Such a random copolymer of propylene and an α-olefin having 4 to 20 carbon atoms is obtainable by, for example, a method described in the pamphlet of WO-A-2004-087775.

<Crosslinking Assistant (C)>

Examples of the crosslinking assistant (C) used in the present invention are preferably sulfur, p-quinone dioxime, p,p'-dibenzoyl quinonedioxime, N-methyl-N-4-dinitroso aniline, nitroso benzene, diphenyl guanidine, trimethylol propane-N,N'-m-phenylene dimaleimide, divinyl benzene, triallyl cyanurate (TAC) and triallyl isocyanurate (TAIC). Further examples thereof may include polyfunctional methacrylate monomers such as ethylene glycol dimethacrylate, diethylene glycol dimethacrylate, polyethylene glycol dimethacrylate, trimethylol propane trimethacrylate and allyl methacrylate; and polyfunctional vinyl monomers such as vinyl butylate and vinyl stearate. Among them, triallyl cyanurate (TAC) and triallyl isocyanurate (TAIC) are preferred.

The crosslinking assistant (C) of the present invention is added in an amount of 0.1 to 5 parts by mass, preferably 0.5 to 5 parts by mass, more preferably 0.5 to 4 parts by mass based on 100 parts by mass of the propylene resin. When the amount of the crosslinking assistant (C) is in the above range, the effect thereof on crosslinking is high and it is possible to prepare a crosslinked material having excellent scratch resistance and heat resistance.

<Inorganic Filler (D)>

The propylene resin composition used in the present invention further may comprise an inorganic filler (D) as an optional component.

The inorganic filler (D) used in the present invention is not particularly limited. For example, metal compounds such as a metal hydroxide, a metal carbonate (carbonated compound), a metal oxide; and inorganic compounds such as glass, ceramic, talc, mica are widely used. Among these compounds, it is preferred to use a metal hydroxide, a metal carbonate (carbonated compound) and a metal oxide. Particularly, magnesium hydroxide is preferred. In the present invention, the inorganic filler (D) may be used singly or two or more may be combined for use.

The inorganic filler (D) has an average particle diameter of usually 0.1 to 20 μm, preferably 0.5 to 15 μm. The average particle diameter is determined by a laser method.

The inorganic filler (D) used in the present invention may be subjected to surface treatment with an aliphatic acid such as stearic acid or oleic acid, or an organosilane, or may be in an aggregate state formed by fine particles having the above average particle diameters.

The inorganic filler (D) used in the present invention is added in an amount of usually 30 to 300 parts by mass, preferably 30 to 280 parts by mass, more preferably 40 to 250 parts by mass based on 100 parts by mass of the propylene resin. When the amount of the inorganic filler (D) used is in the above range, it is possible to prepare a crosslinked material having excellent scratch resistance and flame retardant properties.

<Component Proportion of Propylene Resin Composition>

The crosslinked material of the present invention is obtainable by crosslinking a propylene resin composition which comprises 100 parts by mass of a propylene resin containing 15 to 99% by mass of the propylene polymer (A) and 1 to 85% by mass of the propylene polymer (B) (the total amount of the propylene polymer (A) and the propylene polymer (B) is 100% by mass) and 0.1 to 5 parts by mass of the crosslinking assistant (C), through irradiation with an ionizing radiation. When the contents of the propylene polymer (A) and the propylene polymer (B) are in the above range, it is possible to prepare a crosslinked material having excellent mechanical strength, heat resistance and scratch resistance.

<<Case of Using Random Copolymer (B-1) of Propylene and an α-Olefin Having 4 to 20 Carbon Atoms as the Propylene Polymer (B)>>

In the case of using Random copolymer (B-1) of propylene and an α-olefin having 4 to 20 carbon atoms as the propylene polymer (B), the propylene resin contains the propylene polymer (A) in an amount of 15 to 99% by mass, preferably 30 to 99% by mass, more preferably 40 to 99% by mass, furthermore preferably 50 to 99% by mass, especially, 50 to 98% by mass; and the random copolymer (B-1) of propylene and an α-olefin having 4 to 20 carbon atoms in an amount of 1 to 85% by mass, preferably 1 to 70% by mass, more preferably 1 to 60% by mass, furthermore preferably 1 to 50% by mass, especially, 2 to 50% by mass (the total of the components (A) and (B-1) is 100% by mass).

The propylene resin composition contains a crosslinking agent (C) in an amount of 0.1 to 5 parts by mass, preferably 0.5 to 5 parts by mass, more preferably 0.5 to 4 parts by mass based on 100 parts by mass of the total of the propylene polymer (A) and the random copolymer (B-1) of propylene and an α-olefin having 4 to 20 carbon atoms, namely, based on 100 parts by mass of the propylene resin.

<<Case of Using Inorganic Filler (D) and the Random Copolymer (B-1) of Propylene and an α-Olefin Having 4 to 20 Carbon Atoms as the Propylene Polymer (B)>>

In the case of using the inorganic filler (D) and the random copolymer (B-1) of propylene and an α-olefin having 4 to 20 carbon atoms, the propylene resin contains the propylene polymer (A) in an amount, of 15 to 99% by mass, preferably 30 to 99% by mass, more preferably 40 to 99% by mass, furthermore preferably 50 to 99% by mass, especially, 50 to 98% by mass; and the random copolymer (B-1) of propylene and an α-olefin having 4 to 20 carbon atoms in an amount of 1 to 85% by mass, preferably 1 to 70% by mass, more preferably 1 to 60% by mass, furthermore preferably 1 to 50% by mass, especially, 2 to 50% by mass (the total of the components (A) and (B-1) is 100% by mass).

The propylene resin composition contains the crosslinking agent (C) in an amount of 0.1 to 5 parts by mass, preferably 0.5 to 5 parts by mass, more preferably 0.5 to 4 parts by mass, based on 100 parts by mass of the total of the propylene polymer (A) and the random copolymer (B-1) of propylene and an α-olefin having 4 to 20 carbon atoms, namely, based on 100 parts by mass of the propylene resin. The propylene resin composition contains the inorganic filler (D) in an amount of 30 to 300 parts by mass, preferably 30 to 280 parts by mass, more preferably 40 to 250 parts by mass, furthermore preferably 50 to 250 parts by mass, especially 60 to 250 parts by mass based on 100 parts by mass of the total of the propylene polymer (A) and the random copolymer (B-1) of propylene and an α-olefin having 4 to 20 carbon atoms, namely, based on 100 parts by mass of the propylene resin.

As other components except for the components (A), (B), (C) and (D), the propylene resin composition may optionally contain other synthetic resins, other rubbers, and additives such as an antioxidant, a heat stabilizer, a weather stabilizer, a slipping agent, an anti-blocking agent, a crystal nucleating agent, a pigment, a hydrochloric acid adsorbent and a copper harm inhibitor within not missing the object of the invention.

The amounts of the other synthetic resins, other rubbers and additives added are not particularly limited within not missing the object of the invention. For example, based on 100% by mass of the propylene resin composition excluding the crosslinking assistant (C) and the inorganic filler (D), the total of the propylene polymer (A) and the propylene polymer (B), namely, the propylene resin is contained in an amount of preferably 60 to 100% by mass, more preferably 80 to 100% by mass. The residual components excluding the crosslinking assistant (C) and the inorganic filler (D) are the above other synthetic resins, other rubbers and additives.

<Crosslinking>

The production method of the crosslinked material by crosslinking the propylene resin composition through irradiation with an ionizing radiation is not particularly limited, and it is possible to use a known method. For example, (i) the propylene polymer (A), the propylene polymer (B), the crosslinking assistant (C) and optionally the above other components, or (ii) the propylene polymer (A), the propylene polymer (B), the crosslinking assistant (C), the inorganic filler (D) and optionally the above other components are mechanically mixed using an extruder or a kneader, and crosslinked by irradiation with a prescribed amount of an ionizing radiation.

More specifically, the production method of the crosslinked material according to the present invention comprises a step of molding the propylene resin composition into various shapes using a conventionally known molten molding method to prepare a molded form and a step of crosslinking the molded form by irradiation with an ionizing radiation. In the above manner, the crosslinked material of the present invention can be prepared.

Examples of the conventionally known molten molding method may include extrusion molding, rotation molding, calender molding, injection molding, compression molding, transfer molding, powder molding, blow molding and vacuum molding.

As the ionizing radiation, α-ray, β-ray, γ-ray, electron ray, neutron ray and X-ray are used. Of these rays, γ-ray emitted by cobalt-60, and electron ray are more suitable, and particularly, electron ray is suitable. The exposure dose of the ionizing radiation depends on the kind thereof. When the electron ray is used as the ionizing radiation, the exposure dose is usually 10 to 300 kGy, preferably 20 to 250 kGy.

<Physical Properties of Crosslinked Material>

The crosslinked material obtainable by blending without the inorganic filler (D) has a thermal deformation of preferably less than or equal to 15%, more preferably less than or equal to 10%. Furthermore, it has a wearing loss, which is a standard of evaluating scratch resistance, of preferably less than or equal to 1.2 mg.

The crosslinked material obtainable by blending with the inorganic filler (D) has a thermal deformation of preferably not more than 18% and a wearing loss, which is a standard of evaluating scratch resistance, of preferably not more than 1.0 mg.

The thermal deformation can be determined by preparing a sheet having a thickness of 2 mm by means of a press molding machine in accordance with ASTM D2240, and measuring using the sheet at 180° C. under a load of 1.1 kg in accordance with JIS C3005.

The wearing loss, which is a standard of evaluating the scratch resistance can be determined in the following manner. A specimen having a length of 40 mm, a width of ¼ inch and a thickness of 3 mm is prepared by a press-molding machine. When using a scrape wearing testing machine manufactured by Yasuda Seiki Co., Ltd, the surface of the specimen is rubbed by a music wire having a tip shape of 0.45 mmφ mounted on the top of a wearing indenter made of SUS on which a 700 g weight is put, to wear the surface away. The testing is carried out at room temperature in the conditions that the number of reciprocating rubbing is 1000 times, the reciprocating rate is 60 times/min, and the stroke is 10 mm. In this manner, the mass of the specimen is measured before and after the rubbing and the mass difference can be determined as the wearing loss. The smaller the value of the wearing loss is, the more excellent the scratch resistance is.

[Crosslinked Molded Article]

The crosslinked molded article of the present invention is formed from the crosslinked material obtainable by crosslinking the propylene resin composition through irradiation with an ionizing radiation. The crosslinked molded article may form a composite with a molded form made from other materials, for example, a laminate and the like.

The crosslinked molded article can be suitably used for covering layers such as insulators of electric wires, sheaths of electric wires; industrial materials such as sheets, convenience goods, building materials, sundry goods, wallpapers, gaskets, surface skin materials; car parts, car interior materials; footwear such as soles, sandals; and civil engineering materials. As one example, when the crosslinked molded article is used for covering layers such as an insulator of electric wires, a sheath of electric wires, a covering layer formed from the propylene resin composition is formed around a conductor by a conventionally known method, such as extrusion molding, and then crosslinked by irradiation with an electron ray to prepare an insulator of electric wires or a sheath of electric wires.

EXAMPLE

Hereinafter, the present invention will be described based on the following examples, but the present invention should not be limited by these examples.

<Propylene Polymer (A)>

The following isotactic block polypropylene b-PP was used as the propylene polymer (A).

Propylene/ethylene block copolymer . . . . Melting point (Tm) 160° C., MFR (temperature 230° C. under a load of 2.16 Kg): 0.5 g/10 min, the content of a constitutional unit derived from ethylene: 14.3 mol %, and the amount of a component soluble in n-decane: 12% by mass.

<Propylene Polymer (B)>

The following propylene/1-butene copolymer (B-1) PBR was used as the propylene polymer (B).

Propylene/1-butene copolymer . . . melting point (Tm): 75° C., MFR =7 g/10 min, the content of a constitutional unit derived from 1-butene: 26 mol %, the molecular weight distribution (Mw/Mn): 2.1 and the crystallinity as determined by WAXD method: 28%.

<Crosslinking Assistant (C)>

As the crosslinking assistant (C), triallyl isocyanurate (TAIC) was used.

<Inorganic Filler (D)>

As the inorganic filler (D), magnesium hydroxide (Mg(OH)$_2$, Trade name: Kisuma5B manufactured by Kyowa Chemical Co., Ltd) was used.

<Ethylene Polymer (E)>

Linear low density polyethylene (LLDPE) (density: 923 kg/m$^3$, MFR (temperature 190° C. under a load of 2.16 kg): 2.0) was used.

<Peroxide (F)>

As a peroxide (F), dicumyl peroxide (manufactured by Kayaku Akzo Corporation) (hereinafter, sometimes referred to "DCP") was used.

<Measuring Methods on Physical Properties of Each Component>

The physical properties of each component were determined by the following manners.

(1) The contents of the constitutional unit derived from a comonomer (ethylene and 1-butene) was determined by analysis of $^{13}$C-NMR spectrum.

(2) Melt Flow Rate (MFR)

The melt flow rate was determined at 230° C. under a load of 2.16 kg in accordance with ASTM D-1238.

(3) Melting Point (Tm)

The exothermic and endothermic curve was determined using a differential scanning calorimeter (DSC), and a melting peak having ΔH of not less than 1 J/g during temperature elevation was measured. The temperature at the peak was taken as the melting point (Tm).

A specimen was packed in an aluminum pan, and the temperature was elevated to 200° C. at a rate of 100° C./min and was kept at 200° C. for 5 min. Thereafter, the temperature was decreased to −150° C. at a rate of 10° C./min, and then elevated to 200° C. at a rate of 10° C./min. During this temperature elevation, the melting point (Tm) was determined from the exothermic and endothermic curve.

(4) Molecular Weight Distribution (Mw/Mn)

The molecular weight distribution was measured at 140° C. using an orthodichlorobenzene solvent by a GPC (gel permeation chromatography) relative to polystyrene.

(5) Crystallinity

The crystallinity was determined using CuKα as an X-ray source and RINT 2500 (manufactured by Rigaku Co., Ltd) as a measuring device by wide-angle X-ray profile analysis.

<Items for Evaluation of Crosslinked Material>

(1) Tensile Strength at Breakage (TS) and Elongation at Breakage (EL)

A press sheet having a thickness of 2 mm was prepared by a press molding machine in accordance with ASTM D2240, and tensile strength at breakage (TS) and elongation at breakage (EL) were measured using this sheet in accordance with JIS K7113-2.

(2) Thermal Deformation

A press sheet having a thickness of 2 mm was prepared using a press molding machine in accordance with ASTM D 2240, and the thermal deformation was measured using the sheet at 180° C. under a load of 1.1 kg in accordance with JIS C3005.

(3) Scratch Resistance

The scratch resistance was evaluated in the following manner. A specimen having a length of 40 mm, a width of ¼ inch and a thickness of 3 mm was prepared by a press-molding machine. When using a scrape wearing testing machine manufactured by Yasuda Seiki Co., Ltd, the surface of the specimen was rubbed by a music wire having a tip shape of 0.45 mmφ mounted on the top of a wearing indenter made of SUS on which a 700 g weight was put, the mass of the specimen was measured before and after the rubbing and the mass difference was determined as the wearing loss. The test was carried out at room temperature in conditions that the number of reciprocating rubbing is 1000 times, the reciprocating rate is 60 times/min, and the stroke is 10 mm.

Example 1

The raw material resin components in the amounts as shown in Table 1 were kneaded using a laboplastmill (manufactured by Toyo Seiki Co., Ltd). The mixture was molded into a sheet having a thickness of 2 mm using a press molding machine (heating: 190° C., 7 min, cooling: 15° C., 4 min, and cooling rate: about 40° C./min).

Subsequently, the resulting sheet was irradiated with an electron ray at an accelerating voltage of 2000 kV at an electron ray dose of 100 kGy in the air to prepare a crosslinked material.

The resulting crosslinked material was evaluated on the tensile strength at breakage, elongation at breakage, thermal deformation and scratch resistance. The evaluation results are shown in Table 1.

Comparative Example 1

A resin composition was prepared by blending the components in the amounts as shown in Table 1 and molded into a sheet in the same manner as in Example 1, except that crosslinking by irradiation with an electron ray was not carried out, and then the physical properties were evaluated. The evaluation results are shown in Table 1.

Comparative Examples 2 and 3

In each comparative example, a resin composition was prepared by blending the components as shown in Table 1, and molded into a sheet in the same manner as in Example 1, except that a propylene/1-butene copolymer was not used as the propylene polymer (B), namely, isotactic block polypropylene, which is the propylene polymer (A), was only used as a resin component. In Comparative Example 2, irradiation with an electron ray was carried out, while in Comparative Example 3, irradiation with an electron ray was not carried out. Thereafter, the physical properties were evaluated. The evaluation results are shown in Table 1.

Comparative Example 4

A resin composition prepared by blending the components in the amounts as shown in Table 1 was kneaded by two rolls set at 120° C., to mold a sheet. Thereafter, the sheet was pressurized with heat by a press molding machine heated at 160° C. for 30 min, to prepare a material crosslinked by the peroxide (F). The evaluation results are shown in Table 1.

TABLE 1

|  | unit | Example 1 | Comparative Example 1 | Comparative Example 2 | Comparative Example 3 | Comparative Example 4 |
| --- | --- | --- | --- | --- | --- | --- |
| Propylene polymer (A) | % by mass | 60 | 60 | 100 | 100 | 0 |
| Propylene polymer (B) | % by mass | 40 | 40 | 0 | 0 | 100 |
| Crosslinking assistant (C) | parts by mass (*) | 1.2 | 1.2 | 1.2 | 1.2 | 1.2 |
| Peroxide (F) | parts by mass (*) | 0 | 0 | 0 | 0 | 0.6 |
| Dose of electron irradiation | kGy | 100 | 0 | 100 | 0 | 0 |
| Tensile strength at breakage (TS) | MPa | 30 | 33 | 25 | 26 | 27 |
| Elongation at breakage (EL) | % (between gages) | 680 | 750 | 80 | 370 | 300 |
| Thermal deformation | % | 9.7 | Molten | 17.7 | Molten | Molten |
| Wearing loss | mg | 1.2 | 1.3 | 1.2 | 1.3 | 1.3 |

The value indicated by * is based on 100 parts by mass of the total of the propylene polymer (A) and propylene polymer (B).

In Table 1, the expression "molten" indicates that, the initial shape of the specimen was not kept at 180° C. at the time of measuring the thermal deformation because the heat resistance of the specimen was inferior and therefore, the thermal deformation thereof was not measured.

It is clear that the crosslinked material according to the present invention has more excellent tensile strength at breakage and elongation at breakage, and excellent heat resistance because of having a low thermal deformation as compared with crosslinked materials prepared by using only an isotactic block polypropylene, which is the propylene polymer (A), or crosslinked materials prepared by using only a propylene/1-butene block copolymer, which is the propylene polymer (B) as a resin component.

Example 2 and Comparative Example 5

The procedure of Example 1 was repeated except that a resin composition prepared by the components in the amounts as shown in Table 2 was used, and the physical properties were evaluated. The evaluation results are shown in Table 2.

Comparative Example 6

A resin composition was prepared by blending the components in the amounts as shown in Table 2, and molded into a sheet in the same manner as in Example 1, except that the ethylene polymer (E) in place of the propylene polymer (A) and the propylene polymer (B) was used, and the physical properties were evaluated. The evaluation results are shown in Table 2.

Comparative Example 7

A resin composition prepared by blending the components in the amounts as shown in Table 2 was kneaded by two rolls set at 120° C., and molded into a sheet. Thereafter, the sheet was pressurized with heat by a press molding machine heated at 160° C. for 30 min, to prepare a material crosslinked by the peroxide (F). The evaluation results are shown in Table 2.

Comparative Example 8 and Comparative Example 9

In each comparative example, a resin composition was prepared by blending the components in the amounts as shown in Table 2, and molded into a sheet in the same manner as in Example 1, except that the crosslinking assistant (C) was not used, and the physical properties were evaluated. The evaluation results are shown in Table 2.

TABLE 2

|  | unit | Example 2 | Comparative Example 5 | 6 | 7 | 8 | 9 |
|---|---|---|---|---|---|---|---|
| Propylene polymer (A) | % by mass | 60 | 100 | 0 | 0 | 60 | 60 |
| Propylene polymer (B) | % by mass | 40 | 0 | 0 | 100 | 40 | 40 |
| Crosslinking assistant (C) | parts by mass (*) | 4.8 | 4.8 | 4.8 | 4.8 | 0 | 0 |
| Inorganic filler (D) | parts by mass (*) | 100 | 100 | 100 | 100 | 0 | 100 |
| Ethylene polymer (E) | parts by mass | 0 | 0 | 100 | 0 | 0 | 0 |
| Peroxide (F) | parts by mass (*) | 0 | 0 | 0 | 0.6 | 0 | 0 |
| Dose of electron irradiation | kGy | 100 | 100 | 100 | 0 | 100 | 100 |
| Tensile strength at breakage (TS) | MPa | 22 | 17 | 16 | 17 | 32 | 23 |
| Elongation at breakage (EL) | % (between gages) | 240 | 140 | 90 | 120 | 700 | 460 |
| Thermal deformation | % | 16.5 | 35.2 | 18.5 | Molten | Molten | Molten |
| Wearing loss | mg | 0.5 | 0.5 | 2.5 | 0.6 | 1.3 | 0.6 |

The value indicated by * is based on 100 parts by mass of the total of the propylene polymer (A) and propylene polymer (B).

It is clear that the crosslinked material obtainable by crosslinking the resin composition blended with the inorganic filler (D) (magnesium hydroxide) according to the present invention has excellent tensile strength at breakage and elongation at breakage, and excellent heat resistance because of having a low thermal deformation. Particularly, when it is compared with Comparative Example 6 that the ethylene polymer (E) was used in place of the propylene polymer (A) and the propylene polymer (B), the effect of the present invention is remarkable.

POSSIBILITY OF INDUSTRIAL USE

The crosslinked material obtainable by irradiating the propylene resin composition with an ionizing radiation according to the present invention can be suitably used for industrial materials such as insulators of electric wires, sheaths of electric wires, daily necessaries, building materials, sundry goods, wallpapers, gaskets or surface skin materials; car parts, car interior materials; footwear such as soles, sandals; civil engineering materials; raw fabrics for foamed sheets, and the like.

The invention claimed is:

1. A crosslinked material obtainable by crosslinking a propylene resin composition through irradiation with an ionizing radiation wherein the propylene resin composition comprises:

100 parts by mass of a propylene resin comprising 15 to 99% by mass of a propylene polymer (A) having a melting point, as measured by a differential scanning calorimeter (DSC), of 120 to 170° C., and 1 to 85% by mass of a propylene polymer (B) having a melting point, as measured by a differential scanning calorimeter (DSC), of not more than 100 ° C. provided that the total of the components (A) and (B) is 100% by mass, 0.1 to 5 parts by mass of a crosslinking assistant (C), and 30 to 300 parts by mass of an inorganic filler (D), wherein the propylene polymer (B) is a random copolymer (B-1) containing a constitutional unit derived from propylene and a constitutional unit derived from an α-olefin having 4 to 20 carbon atoms and satisfying the following properties (a) and (b):

(a) the molecular weight distribution (Mw/Mn), as measured by Gel permeation chromatography (GPC), is 1 to 3;

(b) the melting point (Tm) (° C.) and the content M (mol%) of the constitutional unit derived from an α-olefin having 4 to 20 carbon atoms, as determined by $^{13}$C-NMR spectrum, satisfy the following formula (I):

$$146 \exp(-0.022M) \geq Tm \geq 125 \exp(-0.032M) \tag{I}$$

2. The crosslinked material according to claim 1 wherein the inorganic filler (D) is at least one selected from a metal hydroxide, a metal carbonate and a metal oxide.

3. The crosslinked material according to claims 1 or 2 wherein the crosslinking assistant (C) is triallyl cyanurate or triallyl isocyanurate.

4. The crosslinked material according to claims 1 or 2 wherein the propylene polymer (A) comprises 50 to 100 mol% of a constitutional unit derived from propylene and 0 to 50 mol% of a constitutional unit derived from an α-olefin having 2 to 20 carbon atoms other than propylene provided that the total of the constitutional unit derived from propylene and the constitutional unit derived from an α-olefin having 2 to 20 carbon atoms other than propylene is 100 mol%, and the propylene polymer (B) comprises 40 to 100 mol% of a constitutional unit derived from propylene and 0 to 60 mol% of a constitutional unit derived from an α-olefin having 2 to 20 carbon atoms other than propylene provided that the total of the constitutional unit derived from propylene and the constitutional unit derived from an α-olefin having 2 to 20 carbon atoms other than propylene is 100 mol%.

5. A process for producing a crosslinked material which process comprises:

a step of molding the propylene resin composition as described in claims 1 or 2 into a molded form and a step of crosslinking the molded form through irradiation with an ionizing radiation.

6. A crosslinked molded article comprising the crosslinked material according to claims 1 or 2.

7. The crosslinked molded article according to claim 6 is an insulation of an electric wire or a sheath of an electric wire.

* * * * *